United States Patent [19]

Ahn

[11] Patent Number: 5,761,000
[45] Date of Patent: Jun. 2, 1998

[54] DATA STORAGE DEVICES HAVING A SLIM-TYPE HARD DISK DRIVE SUITABLE FOR USE IN PORTABLE COMPUTERS

[75] Inventor: Young-Sub Ahn, Suwon, Rep. of Korea

[73] Assignee: SamSung Electronics Co., Ltd., Kyungki-do, Rep. of Korea

[21] Appl. No.: 744,874

[22] Filed: Nov. 8, 1996

[30] Foreign Application Priority Data

Nov. 30, 1995 [KR]  Rep. of Korea ............... 45690/1995
Dec. 4, 1995 [KR]  Rep. of Korea ............... 46425/1995

[51] Int. Cl.$^6$ .................................................. G11B 17/08
[52] U.S. Cl. ........................................ 360/99.08; 360/106
[58] Field of Search ........................... 360/99.08, 98.07, 360/106

[56] References Cited

U.S. PATENT DOCUMENTS

| | | |
|---|---|---|
| 3,988,024 | 10/1976 | Watanabe et al. . |
| 4,851,731 | 7/1989 | Saotome et al. . |
| 5,038,240 | 8/1991 | Isomura . |
| 5,124,863 | 6/1992 | Koizumi et al. . |
| 5,247,409 | 9/1993 | Sakaguchi . |
| 5,257,152 | 10/1993 | Nagase . |
| 5,291,355 | 3/1994 | Hatch et al. . |
| 5,296,981 | 3/1994 | Ogawa . |
| 5,333,079 | 7/1994 | Takegami et al. . |
| 5,392,176 | 2/1995 | Anderson ............... 360/97.01 |
| 5,412,522 | 5/1995 | Lockhart et al. . |
| 5,424,891 | 6/1995 | Oda et al. . |
| 5,488,523 | 1/1996 | Seaver et al. . |
| 5,528,436 | 6/1996 | Peter . |

FOREIGN PATENT DOCUMENTS

| | | |
|---|---|---|
| 0637022A2 | 5/1995 | European Pat. Off. . |
| 2161313 | 1/1986 | United Kingdom . |

*Primary Examiner*—A. J. Heinz
*Attorney, Agent, or Firm*—Robert E. Bushnell, Esq.

[57] ABSTRACT

A data storage device includes a printed circuit board that serves as a base of the data storage device. A data storage medium is rotatably mounted upon a first shaft that extends from the printed circuit board. A first magnet is installed upon a first surface of the data storage medium for generating a first magnetic field. A first electrically conductive coil is formed within the printed circuit board for generating a second magnetic field in response to an application of electrical current. The first and second magnetic fields interact to produce rotation of the data storage medium about the first shaft. An actuator is rotatably mounted upon a second shaft that extends from the printed circuit board. A magnetic head is installed on a first end of the actuator for reading data from and writing data to the data storage medium. A second magnet is installed on a second end of the actuator positioned opposite to the first end for generating a third magnetic field. A second electrically conductive coil is formed within the printed circuit board for generating a fourth magnetic field in response to an application of electrical current. The third and fourth magnetic fields interact to produce rotation of the actuator about the second shaft, thereby enabling the magnetic head to read from or write data to the data storage medium.

24 Claims, 9 Drawing Sheets

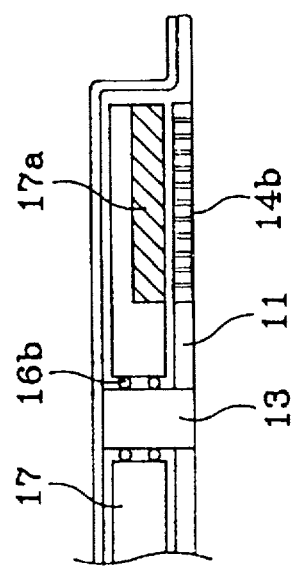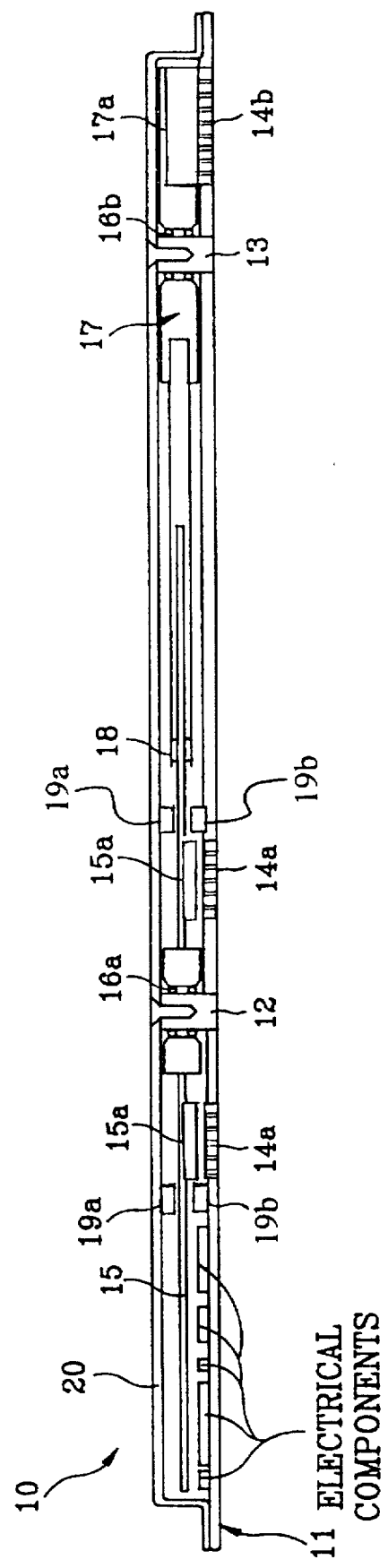

DATA STORAGE DEVICES HAVING A SLIM-TYPE HARD DISK DRIVE SUITABLE FOR USE IN PORTABLE COMPUTERS

CROSS REFERENCE TO RELATED APPLICATION

This application makes reference to, incorporates the same herein, and claims all benefits accruing under 35 U.S.C. §119 from application earlier filed in the Korean Industrial Property Office on 30 Nov. 1995 and there duly assigned Serial No. 45690/1995, and from applications earlier filed in the Korean Industrial Property Office on 4 Dec. 1995 and there assigned Serial Nos. 46425/1995 and 46429/1995, respectively.

BACKGROUND OF THE INVENTION

The present invention relates to data storage devices, such as hard disk drives, and more particularly, to data storage devices which are suitable for use in portable computers.

In today's modern society, the increased use of portable computers has created a driving force in the personal computing industry towards achieving device miniaturization. Consistent with this force, portable computers components, such as hard disk drives, are being developed with increasingly slender designs.

Several prior art references address the need for a thinner disk drive that is suitable for use in a portable computer. U.S. Pat. No. 5,257,152 issued to Nagase, for example, seeks device miniaturization through a specialized spindle design. Other prior art references, such as U.S. Pat. Nos. 5,291,355 and 5,333,079 issued to Hatch et al. and Takegami et al., respectively, provide their own unique approach in seeking miniaturization. Most of these currently available designs, however, require a complex manufacturing procedure that increases production costs, and ultimately increases the final purchase cost for the consumer. In view of this problem, the present invention has been contemplated to provide a hard disk drive for a portable computer that can be manufactured for a reduced cost, and concomitantly provides improved operational efficiency.

SUMMARY OF THE INVENTION

Therefore, it is an object of the present invention to provide an improved design for a hard disk drive that is suitable for use in a portable computer.

It is another object to provide a hard disk drive for a portable computer that exhibits improved operating efficiency.

It is still another object to provide a hard disk drive for a portable computer that can be easily manufactured.

It is yet another object to provide a hard disk drive for a portable computer that can be manufactured at a reduced cost.

These and other objects can be achieved in accordance with the principles of the present invention with a data storage device having a printed circuit board serving as a base of the data storage device. A data storage medium is rotatably mounted upon a first shaft that extends from the printed circuit board. A first magnet is installed upon a first surface of the data storage medium for generating a first magnetic field. A first electrically conductive coil is formed within the printed circuit board for generating a second magnetic field in response to an application of electrical current. The first and second magnetic fields interact to produce rotation of the data storage medium about the first shaft. An actuator is rotatably mounted upon a second shaft that extends from the printed circuit board. A magnetic head is installed on a first end of the actuator for reading data from and writing data to the data storage medium. A second magnet is installed on a second end of the actuator positioned opposite to the first end for generating a third magnetic field. A second electrically conductive coil is formed within the printed circuit board for generating a fourth magnetic field in response to an application of electrical current. The third and fourth magnetic fields interact to produce rotation of the actuator about the second shaft, thereby enabling the magnetic head to read from or write data to the data storage medium.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein:

FIG. 9 shows a cross-sectional view of the configuration for driving the actuator of FIG. 5; and FIG. 10 shows a cross-sectional view of another embodiment of the present invention.

DETAILED DESCRIPTION OF THE INVENTION

Figure 1:
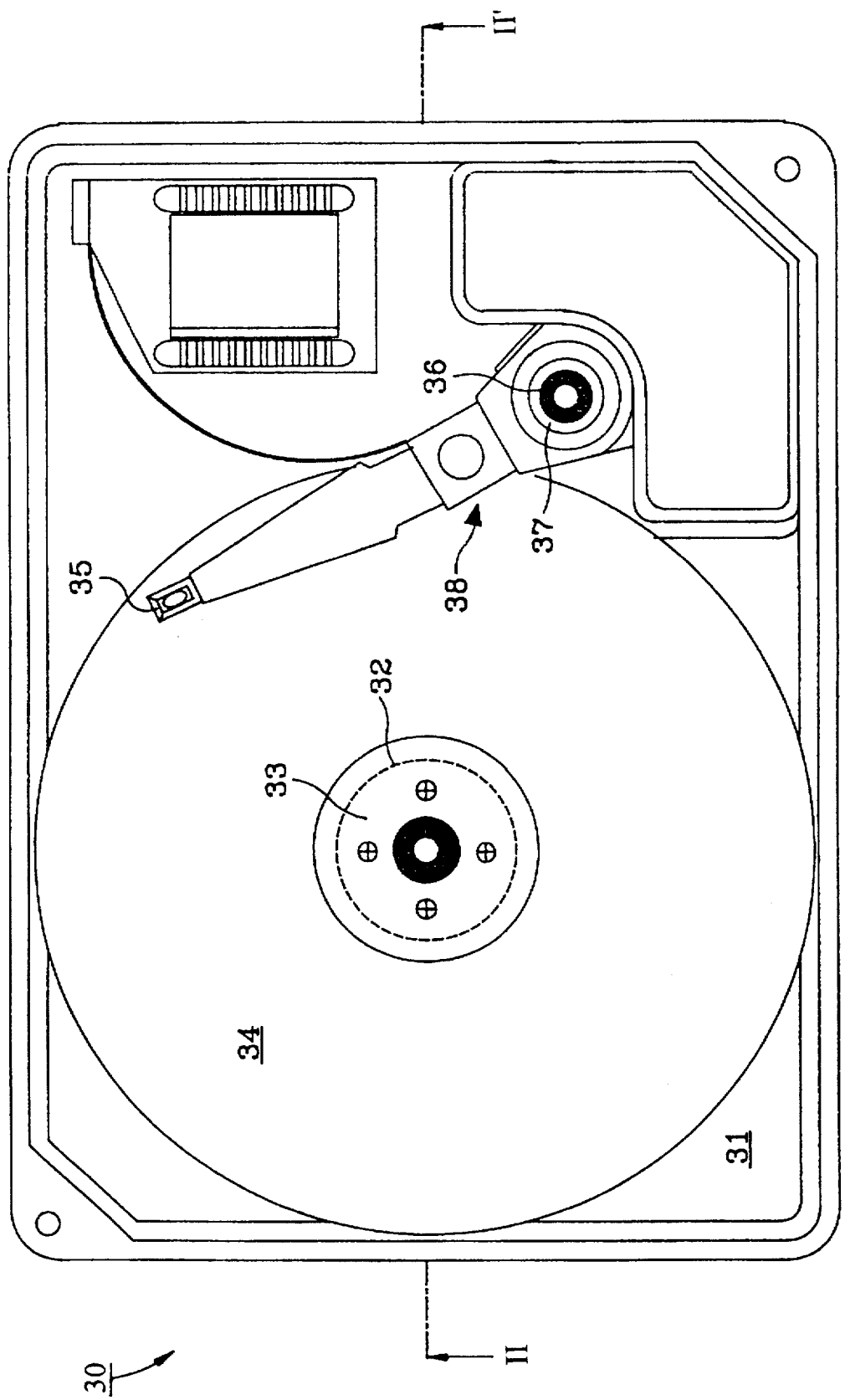
FIG. 1 shows an abstract representation of a hard disk drive.
Figure 2:
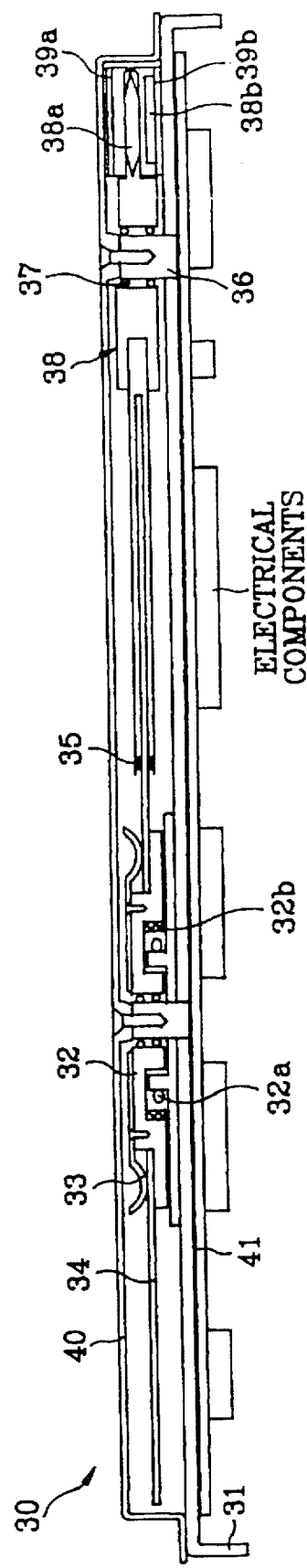
FIG. 2 shows a cross-sectional view of the hard disk drive of FIG. 1 taken along the line II-II'.

Turning now to the drawings and referring to FIG. 1, an abstract representation of a hard disk drive is shown. The hard disk drive of FIG. 1 may be utilized as a main memory device in a portable computer, such as a notebook or lap-top computer. FIG. 2 shows a cross-sectional view of the hard disk drive of FIG. 1 taken along the line II-II'. In FIGS. 1 and 2, the hard disk drive 30 includes a spindle motor 32 installed at one end of a base 31 and a disk 34 fixed to the spindle motor 32. Spindle motor 32 includes an internal coil 32a and a permanent magnet 32b. Disk 34, which is the data storage medium of the hard disk drive 30, is attached to the hub of spindle motor 32 by a clamp 33 and several screws.

Figure 3:
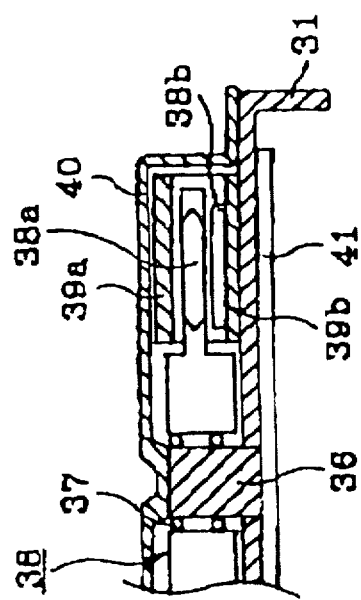
FIG. 3 shows a partial cross-sectional view of the configuration for driving the actuator of FIG. 2.

A magnetic head 35 records information on and reproduces information from the disk 34. Magnetic head 35 is fixedly connected to one end of an actuator 38 which is pivotally mounted on a shaft 36. Shaft 36 is formed on base 31. This pivotal mounting allows actuator 38 to move the magnetic head 35 across the surface of disk 34. Movement of magnetic head 35 is the result of the rotation of actuator 38 on a bearing 37. The rotational force necessary to rotate actuator 38 is supplied by a voice coil motor that includes a bobbin and coil 38a, a permanent magnet 38b, an upper yoke 39a and a lower yoke 39b. FIG. 3 shows a cross-sectional view of the configuration for driving actuator 38 of FIG. 2.

All of the above components are supported by base 31, and are shielded from external conditions by a cover 40. A printed circuit board (PCB) 41 carries the electrical components of the hard disk drive 30, and controls the overall operation of the hard disk drive 30.

When the hard disk drive 30 is turned on, electrical current flows through the internal coil 32a of spindle motor 32. This current flow induces a magnetic field. The interaction of this coil-induced magnetic field with a magnetic field generated by permanent magnet 32b produces a rotational force. This rotational force causes the rotation of spindle motor 32, which in turn, causes the rotation of disk 34. Similarly, a current flow through the coil 38a induces a magnetic field that interacts with a magnetic field generated by permanent magnet 38b. This interaction causes rotation of actuator 38. The rotation of actuator 38 about shaft 36 causes movement of the magnetic head 35 across the surface of disk 34. Air flow between the surface of disk 34 and magnetic head 35 ensures that a small gap is maintained between the surface of disk 34 and magnetic head 35 as the latter moves across the surface of disk 34. During the movement of magnetic head 35 across the surface of disk 34, either data recording or data reproduction takes place.

In the hard disk drive shown in FIG. 2, however, the structural complexity of the various components gives rise to a hard disk drive that is particularly bulky in size. Since the latest advances in portable computers require hard disk drives and other data storage devices that are extremely slim, the hard disk drive of FIG. 2 would be considered obsolete for use in a portable computer.

Figure 5:
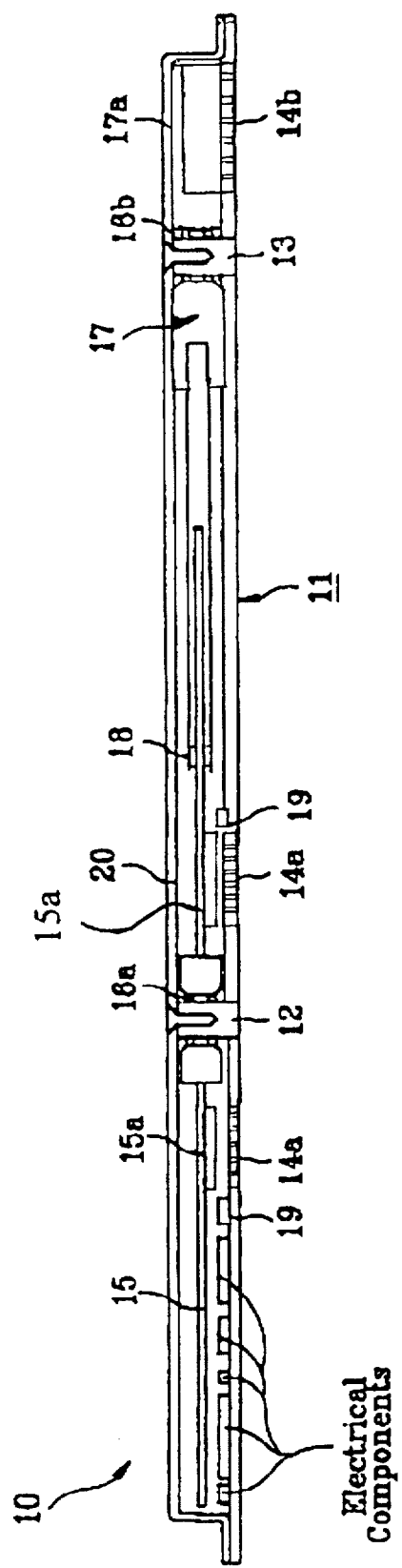
FIG. 5 shows a cross-sectional view of the hard disk drive of FIG. 4 taken along the line III-III'.
Figure 4:
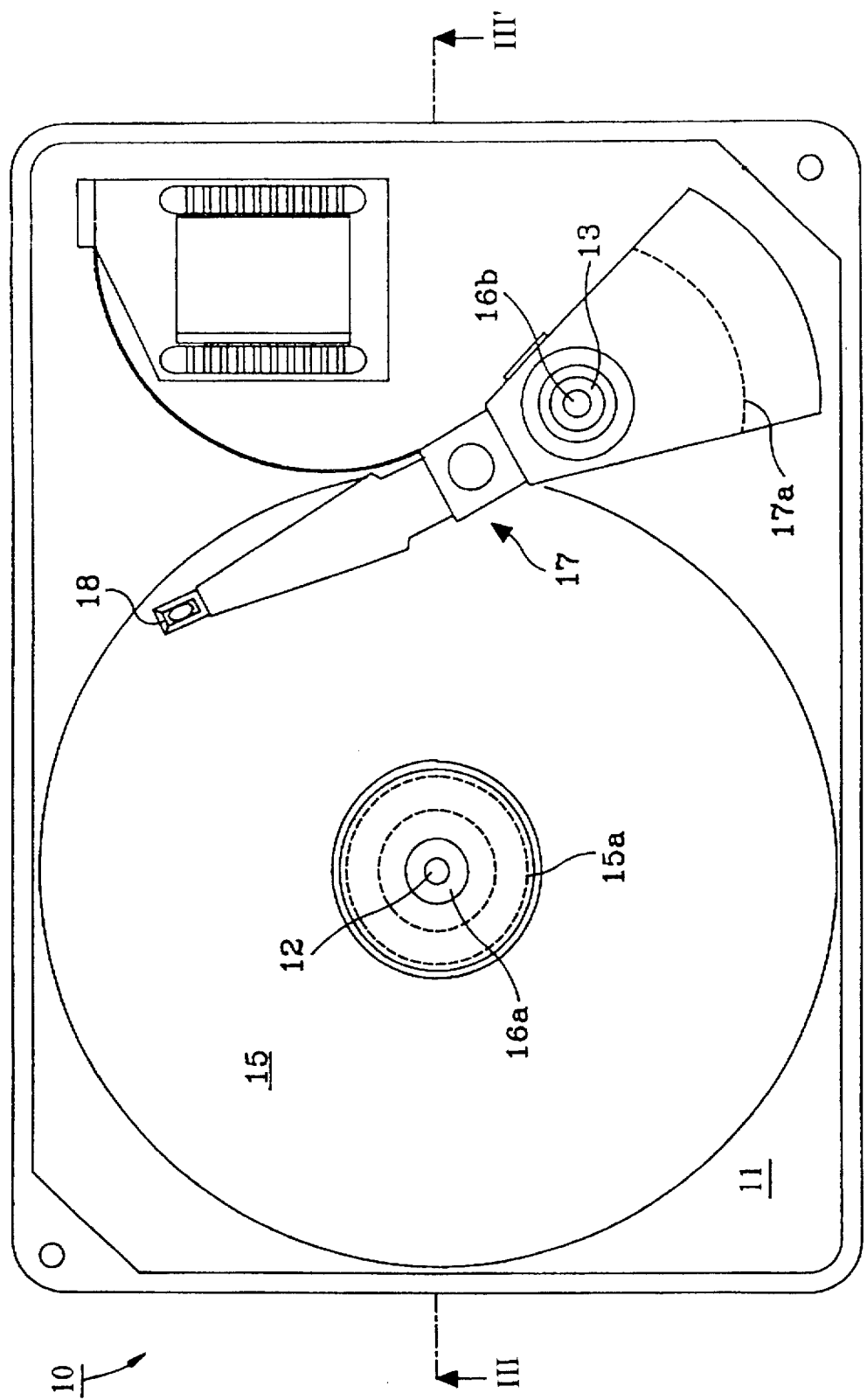
FIG. 4 shows a hard disk drive constructed according to the principles of the present invention.
Figure 6:
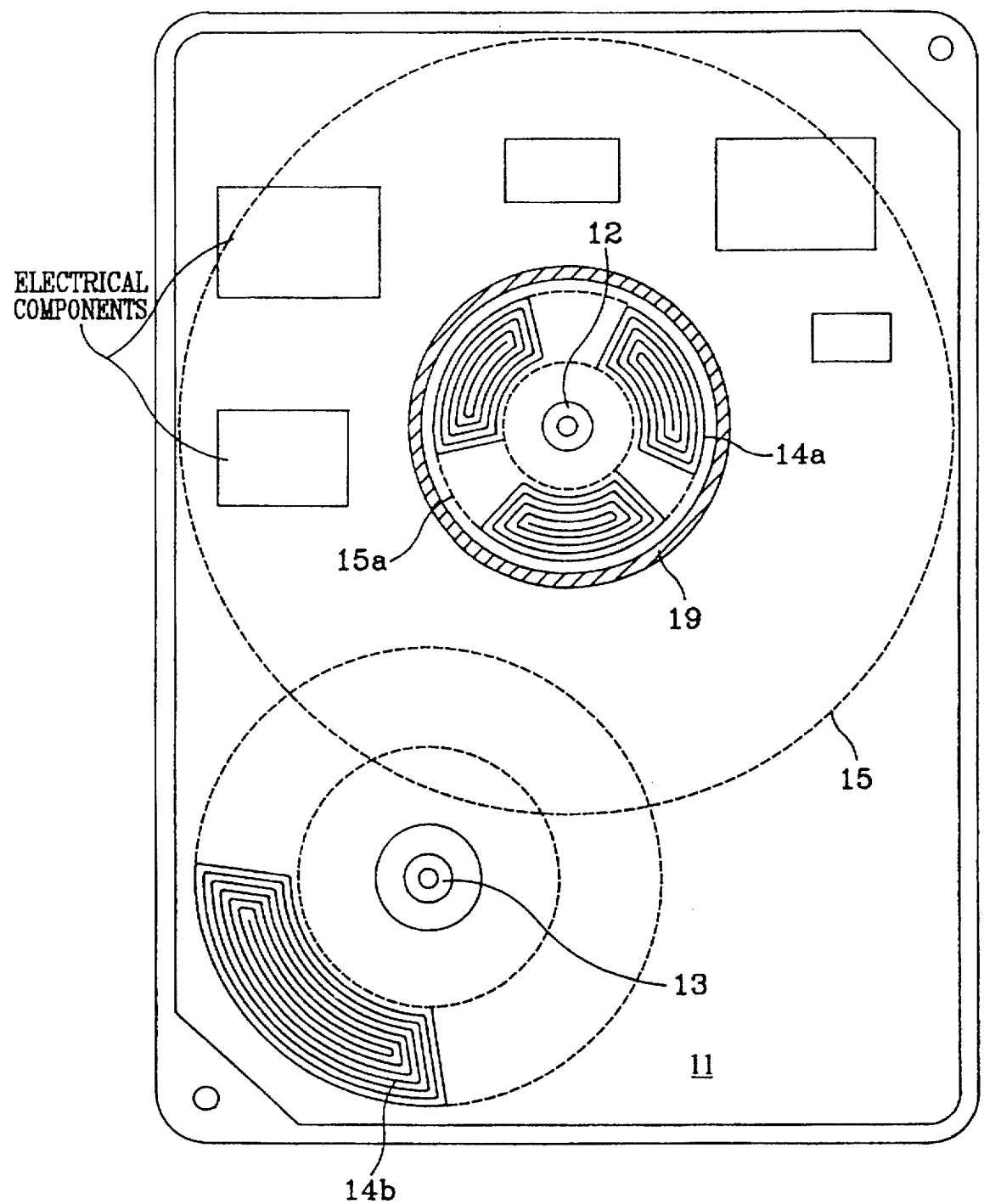
FIG. 6 shows a plan view of a circuit substrate according to the principles of the present invention.

Referring now to FIG. 4, a hard disk drive constructed according to the principles of the present invention is shown. FIG. 5 shows a cross-sectional view of the hard disk drive of FIG. 4 taken along the line III-III', and FIG. 6 shows a plan view of a circuit substrate according to the principles of the present invention. A detailed description of this hard disk drive will now be provided with reference to FIGS. 4 through 6.

A hard disk drive 10 includes a printed circuit board (PCB) 11 which carries the circuits and electrical components of the hard disk drive 10, and also forms the base of the hard disk drive 10. Printed circuit board (PCB) 11 is multi-layered. Attached to printed circuit board (PCB) 11 are a first shaft 12 upon which a disk 15 rotates, and a second shaft 13 upon which an actuator 17 rotates. A pattern coil 14a is formed in printed circuit board (PCB) 11 around first shaft 12, and a pattern coil 14b is formed in printed circuit board (PCB) 11 adjacent to second shaft 13, as shown in FIGS. 5 and 6. Pattern coils 14a and 14b are multi-layered coils, and passage of an electrical current through either coil produces a magnetic field.

A permanent magnet 15a having an annular shape is bonded to a bottom surface of disk 15. The interaction of a magnetic field generated from permanent magnet 15a with a magnetic field generated from pattern coil 14a creates a rotational force that causes disk 15 to rotate about first shaft 12. Disk 15, which is the data storage medium of the hard disk drive 10, rotates via a bearing 16a in the first shaft 12.

Hard disk drive 10 also includes another permanent magnet 17a, which is installed on one end of actuator 17. The interaction of a magnetic field generated from permanent magnet 17a with a magnetic field generated from pattern coil 14b creates a rotational force that causes actuator 17 to rotate about second shaft 13. Actuator 17 rotates via a bearing 16b in the second shaft 13.

Attached to another end of actuator 17 is a magnetic head 18 which records and reproduces data to and from the disk 15. To minimize the effects of magnetic fields on the disk 15 and magnetic head 18, a magnetic field shielding material 19 (e.g., Ferrite bead material) is installed upon printed circuit board (PCB) 11 around the pattern coil 14a, as shown in FIGS. 5 and 6. Magnetic field shielding material 19 protects the disk 15 and magnetic head 18 from the magnetic fields given off by the permanent magnet 15a and pattern coil 14a. Hard disk drive 10 further includes a cover 20 that is connected at each end to the printed circuit board (PCB) 11. Cover 20 hermetically seals the hard disk drive 10 for protection from external conditions.

Figure 7A:
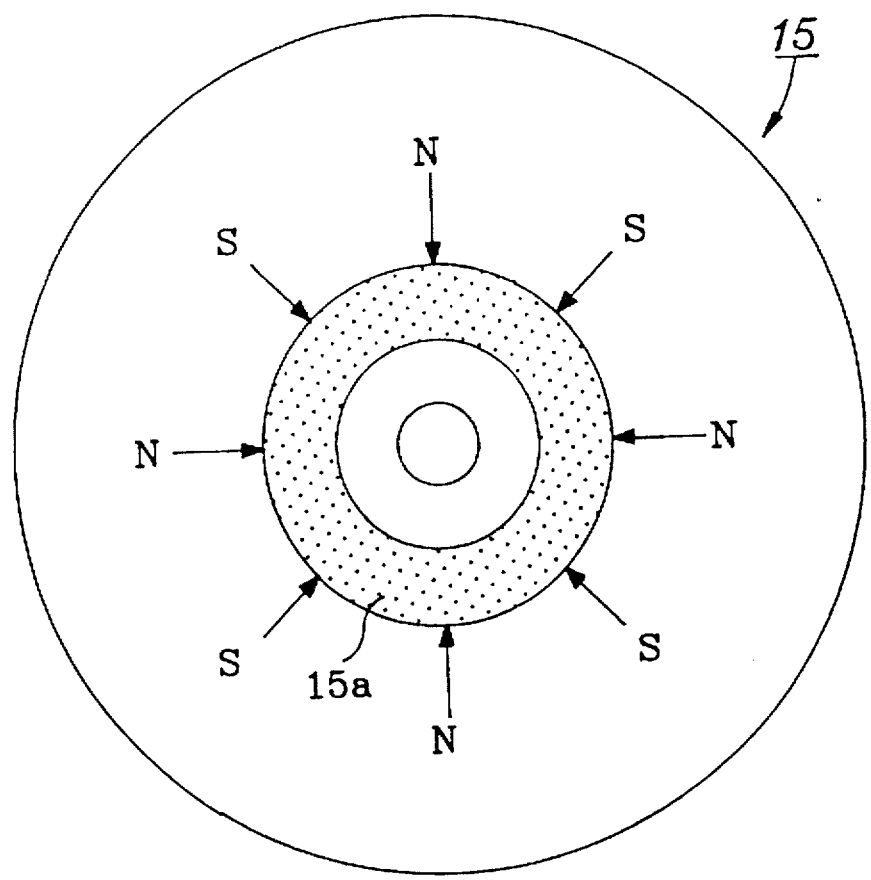
FIGS. 7A and 7B show schematic diagrams of disks constructed according to the principles of the present invention.
Figure 7B:
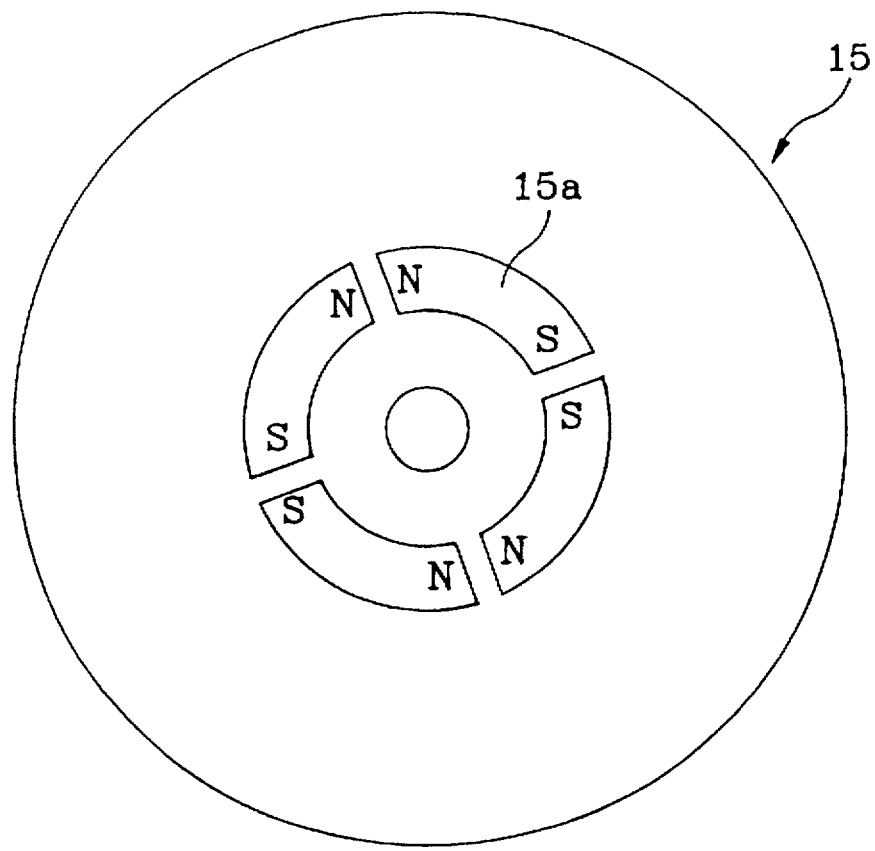

FIGS. 7A and 7B show schematic diagrams of disks according to the principles of the present invention. In particular, FIGS. 7A and 7B show how permanent magnet 15a may be attached to the disk 15. In one arrangement, as shown in FIG. 7A, permanent magnet 15a has an annular shape and is placed concentrically around a central, rotating axis of the disk 15. In this arrangement, permanent magnet 15a is placed so that each of its poles lies between two unlike poles. In another arrangement, as shown in FIG. 7B, permanent magnet 15a is divided into several parts, and the divided parts are arranged so that like poles face each other. In both arrangements, permanent magnet 15a can be bonded to the surface of disk 15 with an adhesive material.

Figure 8A:
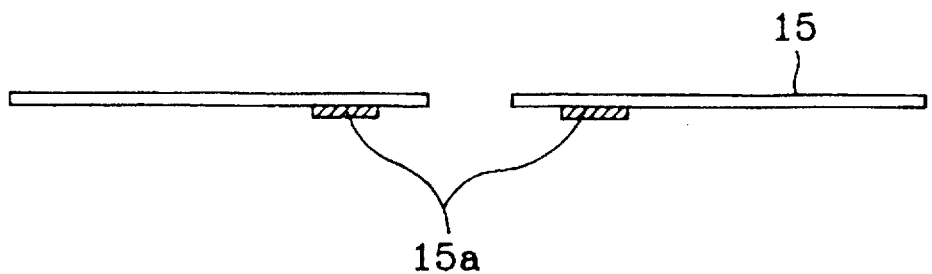
FIGS. 8A through 8C show cross-sectional views of a disk constructed according to the principles of the present invention.
Figure 8B:
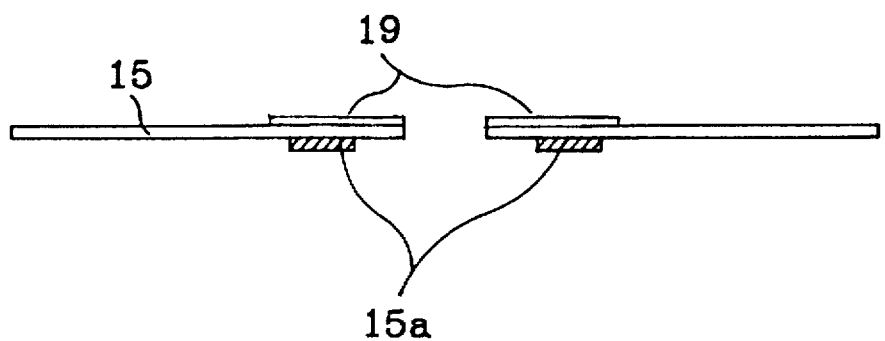
Figure 8C:
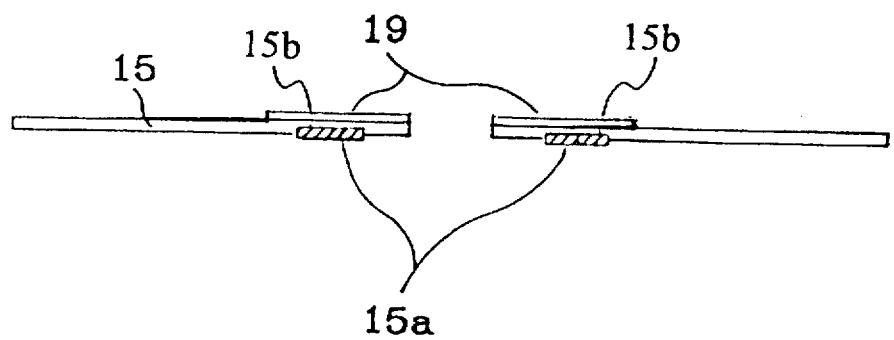

FIGS. 8A through 8C show cross-sectional views of disk 15 constructed according to the principles of the present invention. FIG. 8A shows a standard configuration in which permanent magnet 15a is bonded to the bottom surface of disk 15. FIGS. 8B and 8C show additional configurations in which magnetic field shielding material 19 is supplementally attached to an upper surface of disk 15. In FIGS. 8B and 8C, magnetic field shielding material 19 is an annulus and is placed concentrically around the central axis of the disk 15 to shield the disk 15 from the magnetic field generated from permanent magnet 15a attached to the bottom surface of disk 15. The attachment of permanent magnet 15a to disk 15 in FIG. 8C differs from the attachment shown in FIGS. 8A and 8B. In FIG. 8C, an attachment groove 15b is concentrically formed to a predetermined depth within the bottom surface of disk 15. Permanent magnet 15a is installed within attachment groove 15b by, for example, adhesive bonding. In FIGS. 8A through 8C, the magnetic poles of permanent magnet 15a may be arranged in any of the previously described ways.

FIG. 9 shows a cross-sectional view of the configuration for driving actuator 17 of FIG. 5. In FIG. 9, permanent magnet 17a is attached to one end of actuator 17, and pattern coil 14b is formed adjacent to the second shaft 13 beneath permanent magnet 17a. Pattern coil 14b is formed by printing a signal pattern in printed circuit board (PCB) 11. As pointed out earlier, pattern coil 14b is multi-layered, and accordingly contains a greater number of coil turns than a single layered coil.

FIG. 10 shows another embodiment of the present invention. In this embodiment, a magnetic shielding material 19a is additionally bonded to an inner surface of cover 20. Magnetic shielding material 19a is placed directly opposite to another magnetic shielding material 19b, which is fixed to the printed circuit board (PCB) 11. In FIG. 10, magnetic shielding materials 19a and 19b are annularly formed around first shaft 12 to minimize the effect of magnetic fields on disk 15.

Assembly of the hard disk drive 10 of the present invention will now be described.

First, magnetic shielding material 19 (19b in FIG. 10) is installed upon the surface of printed circuit board (PCB) 11 around pattern coil 14a by, for example, adhesive bonding. Next, the disk 15, upon which the permanent magnet 15a is attached, is mounted upon first shaft 12 so that permanent magnet 15a is positioned directly opposite to pattern coil 14a. At the same time that disk 15 is mounted, the bearing 16a upon which disk 15 rotates is placed inside the first shaft 12. Then, the actuator 17, to which permanent magnet 17a is attached, is mounted upon the second shaft 13 so that permanent magnet 17a is positioned directly opposite to pattern coil 14b. Finally, cover 20 is placed over the foregoing assembly, and attached to the printed circuit board (PCB) 11 through screws that lock into screw holes formed in the first and second shafts 12 and 13. In the embodiment shown in FIG. 10, magnetic field shielding material 19a is attached to the inner surface of cover 20 by, for example, adhesive bonding, prior to connecting cover 20 to the assembly.

When electrical power is supplied to hard disk drive 10, a motor drive (not shown) in the printed circuit board (PCB) 11 generates an electrical current. Passage of this electrical current through the pattern coil 14a generates a magnetic field. The interaction of this magnetic field with the magnetic field generated by permanent magnet 25a produces a rotational force that causes disk 15 to rotate around first shaft 12. Since pattern coil 14a is multi-layered, the rotational force generated from the interacting magnetic fields is capable of rapidly rotating disk 15.

The electrical current generated by the motor drive of the printed circuit board (PCB) 11 also passes through pattern coil 14b to generate a magnetic field. The interaction of this magnetic field with the magnetic field generated by permanent magnet 17a produces a rotational force that causes actuator 17 to rotate about second shaft 13. As actuator 17 rotates, magnetic head 18 positioned on the end of actuator 17 moves across the surface of disk 15 to perform a data recording or reproduction operation. Since pattern coil 14b is multi-layered, the rotational force generated from the interacting magnetic fields is capable of rapidly moving magnetic head 18 across the surface of disk 15. Accordingly, data recording and reproduction can be performed in a rapid and efficient manner. During this operation, both the disk 15 and magnetic head 18 are protected from the magnetic fields by the magnetic field shielding material 19 (19a and 19b in the embodiment of FIG. 10).

As described above, the present invention provides a very simple configuration in which a hard disk drive can be made substantially slimmer, and its operational efficiency improved. The system components are all readily available or easily made. For example, the printed circuit board (PCB) 11 is a standard piece of electronic equipment, and the pattern coils 14a and 14b are easily constructed by printing them on the printed circuit board (PCB) 11. The structural simplicity of the present invention facilitates easy manufacture, as well as overall size reduction. The ease of manufacture reduces production costs, while the reduced size and improved efficiency renders the hard disk drive of the present invention quite suitable for use in the most modern portable computers.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A data storage device, comprising:

a printed circuit board serving as a base of said data storage device;

a data storage medium rotatably mounted upon a shaft that extends from said printed circuit board;

a magnet installed upon a first surface of said data storage medium for generating a first magnetic field; and an electrically conductive coil formed within said printed circuit board for generating a second magnetic field in response to an application of electrical current, the first and second magnetic fields interacting to produce rotation of said data storage medium about said shaft.

2. The data storage device as claimed in claim 1, further comprised of said magnet exhibiting an annular shape and being positioned concentrically about a rotating axis of said data storage medium.

3. The data storage device as claimed in claim 1, further comprised of said electrically conductive coil being multi-layered.

4. The data storage device as claimed in claim 1, further comprising a magnetic field shielding material positioned upon said printed circuit board for shielding said data storage medium from the first and second magnetic fields.

5. The data storage device as claimed in claim 1, further comprised of said magnet being bonded to said first surface of said data storage medium with an adhesive material.

6. The data storage device as claimed in claim 1, further comprising a magnetic field shielding material installed upon a second surface of said data storage medium, said second surface having an orientation opposite to said first surface.

7. The data storage device as claimed in claim 1, further comprised of said data storage medium having a groove exhibiting a predetermined depth formed in said first surface, said magnet being installed within said groove.

8. The data storage device as claimed in claim 1, further comprised of said magnet being divided into a plurality of magnetic segments that are formed about a rotating axis of said data storage medium, said magnetic segments being arranged so that like-poles face each other.

9. The data storage device as claimed in claim 1, wherein said magnet comprises a permanent magnet.

10. The data storage device as claimed in claim 1, further comprising a cover for protecting said data storage device from external conditions.

11. The data storage device as claimed in claim 10, further comprising a magnetic field shielding material attached to an inner surface of said cover for protecting said data storage medium from the first and second magnetic fields.

12. A data storage device, comprising:

a printed circuit board serving as a base of said data storage device;

a data storage medium rotatably mounted upon a first shaft that extends from said printed circuit board;

a first magnet installed upon a first surface of said data storage medium for generating a first magnetic field;

a first electrically conductive coil formed within said printed circuit board for generating a second magnetic field in response to an application of electrical current, the first and second magnetic fields interacting to produce rotation of said data storage medium about said first shaft;

an actuator rotatably mounted upon a second shaft that extends from said printed circuit board;

a magnetic head installed on a first end of said actuator for reading data from and writing data to said data storage medium;

a second magnet installed on a second end of said actuator positioned opposite to said first end for generating a third magnetic field; and a second electrically conductive coil formed within said printed circuit board for generating a fourth magnetic field in response to an application of electrical current, the third and fourth magnetic fields interacting to produce rotation of said actuator about said second shaft.

13. The data storage device as claimed in claim 12, further comprised of said first magnet exhibiting an annular shape and being positioned concentrically about a rotating axis of said data storage medium.

14. The data storage device as claimed in claim 12, further comprised of said first and second electrically conductive coils being multi-layered.

15. The data storage device as claimed in claim 12, further comprising a magnetic field shielding material positioned upon said printed circuit board for shielding said data storage medium from the first and second magnetic fields.

16. The data storage device as claimed in claim 12, further comprised of said first magnet being bonded to said first surface of said data storage medium with an adhesive material.

17. The data storage device as claimed in claim 12, further comprising a magnetic field shielding material installed upon a second surface of said data storage medium said second surface having an orientation opposite to said first surface.

18. The data storage device as claimed in claim 12, further comprised of said data storage medium having a groove exhibiting a predetermined depth formed in said first surface, said first magnet being installed within said groove.

19. The data storage device as claimed in claim 12, further comprised of said first magnet being divided into a plurality of magnetic segments that are formed about a rotating axis of said data storage medium, said magnetic segments being arranged so that like-poles face each other.

20. The data storage device as claimed in claim 12, wherein said first and second magnets are permanent magnets.

21. The data storage device as claimed in claim 12, further comprising a cover for protecting said data storage device from external conditions.

22. The data storage device as claimed in claim 21, further comprising a magnetic field shielding material attached to an inner surface of said cover for protecting said data storage medium from the first and second magnetic fields.

23. A method for assembly a data storage device, comprising the steps of:

installing a first magnetic field shielding material around a first electrically conductive coil formed within a printed circuit board that serves as a base of said data storage device;

attaching a first magnet to a first side of a data storage medium;

mounting said data storage medium bearing said magnet upon a first shaft that extends from said printed circuit board so that said first magnet is oriented opposite to said first electrically conductive coil;

mounting an actuator having a magnetic head on a first end and a second magnet on a second end upon a second shaft that extends from said printed circuit board so that said second magnet is oriented opposite to a second electrically conductive coil formed within said printed circuit board; and installing a cover over said printed circuit board to protect said data storage device from external conditions.

24. The method as claimed in claim 23, further comprised of attaching a second magnetic field shielding material to an inner surface of said cover prior to installing said cover over said printed circuit board.

* * * * *